United States Patent [19]
Bercaits

[11] Patent Number: 5,975,743
[45] Date of Patent: Nov. 2, 1999

[54] METHOD FOR AUTOMATICALLY CUTTING PORTIONS OF A PATTERNED FABRIC

[75] Inventor: Jean-Louis Bercaits, Canejan, France

[73] Assignee: Lectra Systems, France

[21] Appl. No.: 08/737,547

[22] PCT Filed: Mar. 18, 1996

[86] PCT No.: PCT/FR96/00406

§ 371 Date: Nov. 12, 1996

§ 102(e) Date: Nov. 12, 1996

[87] PCT Pub. No.: WO96/28985

PCT Pub. Date: Sep. 26, 1996

[30] Foreign Application Priority Data

Mar. 17, 1995 [FR] France .................................. 95 03111

[51] Int. Cl.[6] .............................. G06F 19/00; A41H 3/00
[52] U.S. Cl. .................................. 364/470.05; 364/470.06
[58] Field of Search ............................ 83/936, 937, 938, 83/939, 940, 941; 364/470.01–470.6, 470.14; 382/111

[56] References Cited

U.S. PATENT DOCUMENTS

| | | | |
|---|---|---|---|
| 4,853,866 | 8/1989 | Galan et al. ........................ | 364/470.06 |
| 4,905,159 | 2/1990 | Loriot .................................. | 364/470.05 |
| 5,172,326 | 12/1992 | Campbell, Jr. et al. ........... | 364/470.05 |
| 5,333,111 | 7/1994 | Chaiken et al. .................... | 364/470.06 |
| 5,353,355 | 10/1994 | Takagi et al. ...................... | 382/111 |
| 5,487,011 | 1/1996 | Chaiken ............................. | 364/470.06 |
| 5,508,936 | 4/1996 | King et al. ......................... | 364/470.06 |

FOREIGN PATENT DOCUMENTS

| | | |
|---|---|---|
| 0518473 | 12/1992 | European Pat. Off. . |
| 0577842 | 1/1994 | European Pat. Off. . |
| 3519806 | 8/1986 | Germany . |
| WO 91/17029 | 11/1991 | WIPO . |

OTHER PUBLICATIONS

PCT International Search Report for PCT/FR96/00406 Jul. 1996.

*Primary Examiner*—William Grant
*Assistant Examiner*—Steven R. Garland
*Attorney, Agent, or Firm*—Jones & Askew, LLP

[57] ABSTRACT

An ideal layout for the pieces on the patterned fabric is determined and stored. Monitoring is performed on the real fabric (20) by detecting any offset between the real pitch of the pattern (M) on the fabric as spread out and the ideal pitch used to determine the layout. The layout is modified as a function of the detected offset so that the layout matches the real pitch on the spread-out fabric before the fabric is cut. Monitoring the fabric is performed by taking images of portions of the spread-out fabric by means of a camera (60), and by verifying the images as taken to see whether the locations corresponding to the stored information occupy the desired positions relative to the real pattern on the spread-out fabric.

11 Claims, 3 Drawing Sheets

METHOD FOR AUTOMATICALLY CUTTING PORTIONS OF A PATTERNED FABRIC

BACKGROUND OF THE INVENTION

The present invention relates to a method for automatically cutting pieces from a patterned fabric.

Fields of application for the invention are in particular the clothing industry and the furniture industry.

When making articles of clothing or pieces of furniture involving assembling together pieces cut from a fabric, there are special constraints if the fabric is patterned, the term "patterned fabric" designating herein any flexible sheet textile material printed with a pattern that is repeated with a uniform pitch. The pitch of the fabric, or pattern repeat pitch, is the distance between successive repeating patterns.

It is then desirable or even necessary to ensure that the pattern continues uninterrupted between two assembled-together pieces, e.g. two pieces of a garment sewn together, or two pieces intended to be adjacent, e.g. two portions of a garment situated side-by-side while the garment is being worn, or two cushions of a sofa placed side-by-side.

In order to satisfy these constraints, it is known that the pieces can be associated with absolute or relative position references, and a hierarchy can be established between main pieces and secondary pieces.

An absolute position reference is normally associated with a main piece. It characterizes the absolute positioning of the main piece relative to the pattern of the fabric. The position of a piece relative to the pattern is characterized by the fact that a given point on the surface of the piece occupies a determined relative position relative to the patterns surrounding it. Thus, pieces whose locations on the surface of the fabric can be deduced from one another by translations through an integer number of pattern pitch steps occupy the same positions relative to the pattern.

Relative position references are associated with two pieces that are to be assembled together, while taking into account constraints related to the existence of the pattern. They identify the locations of two match points that are to be brought in register with each other on assembling together the pieces.

For example, for a jacket, a front piece may constitute a main piece. An absolute position reference may optionally be associated with the front piece, e.g. when it is desired for a complete pattern to be visible at a particular location of the piece. The sleeve, the collar, and the pocket flap then constitute secondary pieces. For each of these secondary pieces, a match point is determined so as to correspond to the location of the associated match point on the main piece.

Naturally, match points may be defined not only between a main piece and a secondary piece, but also between two secondary pieces, one of them then acting as main piece relative to the other.

It is also known that fabric can be cut automatically. Automatic cutting installations have been sold by the Applicant for many years.

An automatic cutting method includes a layout-definition operation which consists in optimally determining the positions of the pieces to be cut from a strip of fabric. The layout is chosen so as to minimize fabric wastage while satisfying certain constraints: (cutting on or off the grain, minimum spacing between pieces to be cut, etc.). With a patterned fabric, there are also constraints related to complying with the locations of absolute position references and of relative position references. Systems enabling an operator to define layouts by means of computer workstations and of specialized software are known, including systems that can be used for patterned fabrics.

To perform cutting, the fabric is spread out on a cutting table in one or more superposed layers which may be held by suction via the table. Cutting is performed by means of a tool carried by a head which is displaced relative to the cutting table as a function of the predetermined layout. Cutting may be performed by a vibrating blade, a laser, a water jet, etc.

Particular difficulties appear when the fabric is a patterned fabric.

A first problem to be solved, if a plurality of superposed layers of patterned fabric are to be cut simultaneously is that a lay-up of layers must be formed so that the patterns are exactly superposed. A known technique consists in using needles which pass through the lay-up and prevent the layers from slipping relative to one another. Reference may be made to Document FR-A-2 644 484.

A second problem which arises in practice is the problem of the reference fabric used to define the layout not coinciding with the fabric actually spread out on the cutting table. This gives rise in particular to the following: on the cutting table, by going to the co-ordinates of a reference point of a piece in the layout, it can be observed that the corresponding point on the spread-out fabric does not always occupy the desired relative position relative to the pattern on the real fabric. These shifts are of varying size and, in practice, they are inevitable. They are caused by printing errors and/or by deformation of the fabric that can result in the pattern repeat pitch being non-uniform. As a result, the pre-established or ideal layout must be modified so as to correspond to the reality of the fabric as spread out.

One method for performing such layout modification automatically or semi-automatically is described in Document U.S. Pat. No. 4,853,866. After the patterned fabric has been spread out on the cutting table, a camera is brought to the various locations corresponding to the coordinates of the reference points. The real image of the fabric in the vicinity of the assumed location of an absolute position reference point is compared with the ideal image that the vicinity should have, the comparison being performed by digitizing the real image and correlating it with a recorded ideal image. Furthermore, the real images of the fabric in the vicinities of the match points are taken and stored so as to compare the real images of the vicinities of two corresponding match points. The results of the comparisons are used to offset the positions of the pieces in the layout so as to obtain a modified layout which corresponds to the reality of the spread-out fabric and in compliance with which the spread-out fabric is then cut.

That known method suffers from several drawbacks which affect the productivity of the installation and substantially increase the cost of the installation. Fully exploring all of the locations corresponding to the stored co-ordinates of the reference points requires a non-negligible amount of time during which the cutting installation is not available. In addition, such full exploration involves storing images, which requires large digital storage means, it being necessary to store the image of the vicinity of a match point on a piece so long as the image of the corresponding match point on another piece has not been detected and digitized, and so long as the two images have not been compared. Furthermore, full exploration requires a cutting table that is long enough for the length of fabric corresponding to an entire layout to be spread out thereon, which means that that known method cannot be implemented in installations using short cutting tables for cutting fabric that is plain or that does not require matching.

It has also been proposed, in Document WO-A-91/17029 to insert into the layout reference pieces of repetitive shape at constant intervals equal to an integer number of ideal pattern repeat pitch steps of the pattern of the fabric. By examining the locations of the pieces on the spread-out fabric, it is possible to verify whether an offset exists between the ideal repeat pitch and the real repeat pitch of the pattern of the fabric, and to correct the layout where necessary. This examination may be made by cutting out reference pieces or by visually examining their locations on the spread-out fabric. The method disclosed in Document WO-A-91/17029 therefore makes it necessary to interrupt cutting out each time a new reference piece is encountered, which penalizes efficiency considerably, in particular since the spacing between reference pieces must not be too large so that it is possible for any offset occurring between the ideal repeat pitch and the real repeat pitch of the pattern to be corrected sufficiently rapidly. Furthermore, the presence of reference pieces in the layout complicates the layout and gives rise to inevitable wastage of material.

SUMMARY OF THE INVENTION

An object of the invention is to provide a method of automatically cutting pieces from a patterned fabric, which method does not suffer from those drawbacks.

In particular, an object of the invention is to provide a method of automatically cutting patterned fabric, the performance levels of which method with respect to productivity remain almost as good as those of methods of automatically cutting fabric that is plain or that does not require matching.

Another object of the invention is to provide a method whereby cutting a patterned fabric can be commenced before the ideal layout has been fully modified, so that it is possible to use a short cutting table such as is used for fabric that is plain or that does not require matching, and onto which a length of fabric corresponding to a layout is fed progressively as cutting proceeds.

Yet another object of the invention is to provide a method whereby correcting an ideal layout on a patterned fabric, for the purposes of cutting pieces from it, can be performed with small image-storage means.

The invention achieves these objects by providing a method comprising the following steps:

determining an ideal layout for the pieces on the fabric;

storing information representative of the ideal layout of the pieces;

spreading out at least one layer of fabric to be cut;

monitoring the spread-out fabric so as to detect any offset between the real pitch of the pattern on the spread-out fabric and the ideal pitch used to determine the ideal layout; and modifying, where necessary, the ideal layout as a function of the result of the monitoring so that the layout matches the reality of the pattern pitch on the spread-out fabric;

said method being characterized in that the monitoring step comprises the following operations:

taking images of portions of the spread-out fabric; and verifying the images as taken to see whether the locations corresponding to the stored information occupy the desired positions relative to the real pattern on the spread-out fabric.

Advantageously, the monitoring step is performed successively at various locations on the spread-out fabric starting from a longitudinal end thereof, and the layout is modified progressively as the monitoring step proceeds.

During each of the successive monitoring operations:

the position of a piece situated at the location at which the monitoring operation is performed is, where necessary, modified finally in the layout as a function of the real pattern pitch as detected; and the positions of the pieces situated in the portion of the fabric that has not yet been monitored are, where necessary, modified pre-emptively in the layout.

The remainder of the layout may be modified pre-emptively in the same way as for the piece situated at the location at which the monitoring operation is performed, or as a function of the various offsets detected during the monitoring operations performed starting from said longitudinal end of the fabric. In the latter case, it is possible to correct in advance a non-uniform offset whose variation can be predicted on the basis of the first detected offsets. Such a non-uniform offset can occur in particular when the repeat pitch of the pattern in the spread-out fabric is not exactly equal to the repeat pitch of the pattern in the ideal fabric on the basis of which the layout has been determined. When layouts are relatively long, if pre-emptive modification is not performed, such an error in the repeat pitch, if it is a large error, could result, by accumulation, in an offset of one or more pitch steps in the monitoring operation performed at the end of the layout.

Monitoring the spread-out fabric by detecting the real pattern pitch and measuring the offset between it and the ideal fabric pattern pitch makes it possible for the layout to be corrected progressively starting from a longitudinal end of the fabric. The fabric can then be cut starting from said longitudinal end as the monitoring proceeds. This is not possible when monitoring is performed by image comparison, as it is in the above-mentioned prior art.

The possibility of starting cutting before the layout has been fully corrected is particularly advantageous. This feature of the invention enables it to be implemented in an automatic cutting installation in which the cutting table is short, optionally shorter than the total length of a layout. The fabric is advanced on the table intermittently as cutting proceeds until the entire layout has been cut. Each time a new length of fabric is fed onto the cutting table, monitoring is performed on the portion of fabric spread out on the table, the layout is modified where necessary as a function of the results of the monitoring, and the pieces situated in a working zone of the cutting table can be cut. By enabling cutting tables to be used that are short such as those used for fabric that is plain or that does not require matching, the invention makes it unnecessary to have special installations for cutting patterned fabrics.

Advantageously, the monitoring step is performed at least in part while the fabric is advancing on the table. In particular, taking images of portions of the surface of the spread-out fabric can be performed at least in part while the fabric is advancing.

Thus, in addition to the productivity gain obtained by the possibility of saving time by modifying the layout in part during cutting, it is possible to obtain a further gain by saving time by performing monitoring in part while the fabric is advancing.

According to another feature of the method, a characteristic point of the pattern of the fabric is selected, the position of which point is repeated in the same way as the pattern, and the real pitch of the pattern is detected by detecting the positions of characteristic points of the pattern on the fabric.

In this way, for each of a plurality of pieces, the method may include the following steps:

defining at least one reference point coinciding with a characteristic point of the pattern of the ideal fabric;

storing information representative of the position of the reference point; and performing a monitoring operation by detecting any offset between the point on the spread-out fabric, the co-ordinates of which point correspond to the stored position information, and the nearest characteristic point of the pattern on the spread-out fabric, and performing final repositioning of the piece in the layout as a function of the detected offset.

During each monitoring operation, for each of the pieces that have not yet been processed and with which reference points are associated, the information representative of the positions of the reference points are modified pre-emptively in the same way as the position of the piece is modified.

For each piece in question, the monitoring step may include the following operations:

taking an image of a portion of the surface of the spread-out fabric, which portion includes the point on the fabric whose co-ordinates on the spread-out fabric correspond to the stored position information for the reference point of the piece; and detecting the offset between the real position of this point on the fabric and the real position of the nearest characteristic point of the pattern in the image as taken.

The monitoring step may be performed semi-automatically, and it then includes:

displaying the image as taken on a screen;

causing to appear on the screen the position of the reference point whose co-ordinates correspond to the stored position information; and inputting, on the basis of the image displayed on the screen, the real position of the characteristic point of the pattern that is nearest to the position of the reference point as it appears.

The real position of the characteristic point of the pattern that is nearest to the position of the reference point as it appears is input by indicating said real position by means of a cursor actuated by an operator.

The monitoring step may also be performed automatically by analyzing the image as taken so as to determine the real positions of the characteristic points of the pattern that it contains, and by searching for that one of them which is nearest to the position of the reference point whose co-ordinates correspond to the stored position information, so as to measure any offset between the position of the reference point and the real position of the nearest characteristic point.

Whether monitoring is semi-automatic or automatic, as soon as an image has been processed, any correction to be made to the position of the corresponding piece in the layout is made almost instantaneously, and cutting of the piece can be started even before the following image has been processed.

For the pieces associated with relative position reference points or match points, the reference point chosen is advantageously the characteristic point of the pattern that is nearest to the match point so as to give the match point on the spread-out fabric a position that is as accurate as possible.

In the same way, for a main piece having an absolute position reference, the reference point chosen is the characteristic point of the pattern that is nearest to the absolute position reference point.

The invention will be better understood on reading the following description given by way of non-limiting example and with reference to the accompanying drawings, in which:

DESCRIPTION OF THE PREFERRED EMBODIMENTS

Figure 1:
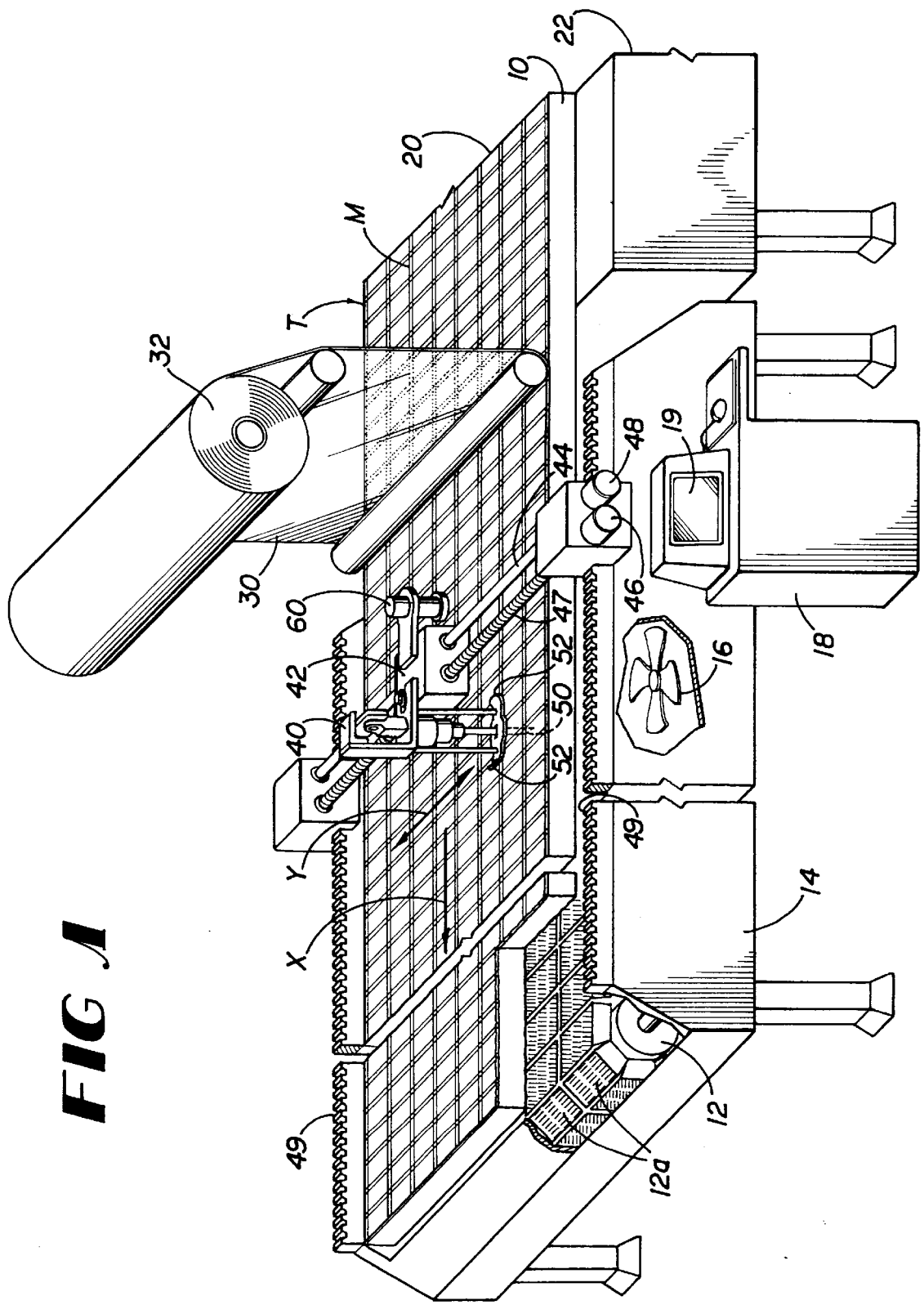
FIG. 1 is a very diagrammatic overall view of an installation enabling the method of the invention to be implemented.

An embodiment of an automatic cutting installation enabling the method of the invention to be implemented is shown very diagrammatically in FIG. 1.

Cutting is performed on a cutting table 10 constituted by the horizontal top run of an endless conveyor 12. With the exception of its top surface which defines the table 10, the conveyor is received in a casing 14. Suction means such as extractor fans 16 are disposed inside the casing so as to generate suction therein.

The conveyor 12 is made up of support segments 12a provided with or forming through holes causing the inside of the casing to communicate with the surface of the table 10. Each of the segments 12a, which are made, for example, of a plastics material, has a base from which a plurality of filamentary elements project. In this way, a blade can penetrate into the surface of the table 10 and can move horizontally in all directions without being damaged and without damaging the support segments 12a.

A fabric T to be cut carrying a repetitive pattern M is fed onto the table 10 in a single layer, or, as shown, in superposed layers forming a lay-up 20. The lay-up is formed on a lay-up table 22, upstream from the cutting table, while making sure that the patterns M in the layers of fabric are superposed exactly, it being possible for the layers of fabric to be held relative to one another by means of needles passing through the lay-up 20. The lay-up 20 is advanced along the cutting table in the direction X by controlling the drive motor (not shown) for driving the conveyor 12.

An airtight transparent film 30 of a plastics material, e.g. polyethylene, is paid out from a roller 32 and deposited on the lay-up 20 so as to cover it completely.

The lay-up 20 carried by the table 10 and covered with the film 30 is cut by means of a cutting head 40. The cutting head can be brought into any position above the cutting table 10 by controlling its horizontal displacement parallel to the longitudinal direction X of the conveyor 12 and parallel to the transverse direction Y perpendicular to X.

The cutting head 40 is mounted on a slider 42 mounted to move in direction Y along a cross-beam 44 under the control of a motor 46. The cross-beam 44 is guided at its ends along the longitudinal edges of the conveyor 12, and it is driven in direction X under the control of a motor 48. The slider 42 may be driven conventionally via cables, or, as in the example shown, via a worm screw 47. The cross-beam 44 may also be driven via cables or a worm screw, or, as shown, via toothed wheels and racks 49 which are mounted on top longitudinal edges of the casing 14.

The cutting head 40 carries a cutting blade 50 suspended vertically through a presser foot 52. The blade 50 and the presser foot 52 are mounted to move between a raised (rest) position and a lowered position in which the presser foot is in contact with the lay-up 20. The fabric is cut by driving the blade 50 in a vertical reciprocating motion and by displacing the cutting head 40, the blade 50 and the presser foot 52 being steerable about a vertical axis so as to follow the outlines of the pieces to be cut from the lay-up.

The displacements of the cutting head 40 in the directions X and Y, the lowering and the raising of the cutting blade 50 and of the presser foot 52, the vertical reciprocating motion of the blade 50, and the steering of the cutting blade 50 and of the presser foot 52 are controlled by means of a computer 18 via drive members and links (not shown). The computer 18 further controls the advance of the conveyor 12 and the suction in the casing 14 whereby the lay-up 20 covered with the airtight film 30 is held firmly against the cutting table 10.

An installation such as the above-described installation is well known to a person skilled in the art. Reference may be made, for example, to Document U.S. Pat. No. 3,848,490.

The displacements of the cutting head in directions X and Y are controlled such as to cut pieces from the lay-up in compliance with a determined layout. During cutting, the cutting blade 50 is steered such that it remains tangential or substantially tangential to the outline of the cut piece. Once a segment of the lay-up 20 lying on the cutting table 10 has been cut, with the film 30, the conveyor 12 is caused to advance so as to feed a new segment of the lay-up, or a new lay-up, onto the cutting table. It is also possible for the lay-up to be advanced without interrupting cutting, successive lengths of lay-up being fed into the working zone of the cutting table 10 as the cutting operation progresses. A method making it possible to save time by advancing the lay-up during cutting is described in Document WO-A-95/02489.

The layout operation, performed prior to cutting, consists in determining the locations of the pieces to be cut. The layout is determined so as to minimize wastage of material, while satisfying certain constraints (cutting on or off the grain, minimum spacing between pieces to be cut, etc.). On a fabric with a repetitive pattern, there can be aesthetic constraints: it can be necessary for the entire pattern to be included in certain pieces, and at particular places on the pieces, or for two pieces that are to be assembled together to be cut such that the continuity of the pattern is maintained after they have been assembled together.

It is known that, for this purpose, absolute position reference points may be defined whose positions on the pieces are determined so that a pattern appears in a desired place. It is likewise known that relative position reference points or match points may be defined whose respective positions on two pieces are chosen so that, by causing the match points to coincide, it is possible to assemble together the two pieces in the desired manner, e.g. so that the continuity of the pattern is maintained.

For the fabric T having a repetitive pattern M such as the pattern shown in FIG. 2, the layout is defined, for example, as follows. For the pieces such as the piece $P_1$ having an absolute position reference point $A_1$, the layout is defined by maintaining the position of point $A_1$ relative to the pattern. Any match points carried by the same piece, such as points $R_{12}$ and $R_{13}$, are then placed automatically. For pieces such as pieces $P_2$ and $P_3$ that are to be secured to the piece $P_1$, and starting from the respective match points $R_{21}$ and $R_{31}$ corresponding to the match points $R_{12}$ and $R_{13}$, the layout is defined by maintaining the positions of the points $R_{21}$ and $R_{31}$ relative to the pattern. If $P_1$ carries no absolute position reference point, its layout is defined such as to maintain the position of a match point $R_{12}$ or $R_{13}$ relative to the pattern.

The layout is usually defined by an operator by means of a computerized workstation and of specialized software. The locations and the outlines of the pieces to be cut are stored, as is information representative of the positions of the absolute position reference points and of the match points.

In this example, the information representative of the position of a position reference point is stored in the form of the co-ordinates of the nearest characteristic point of the pattern.

A characteristic point of a pattern is an easily recognizable element of the pattern of the fabric that repeats itself with the same pitch as the pattern. On the fabric T shown in FIG. 2, in which the pattern M is a check of squares bordered with double lines, the arbitrarily chosen characteristic point C is, for example, the bottom left corner of a square.

Depending on the pattern on the fabric, any graphics feature may be chosen as a characteristic point, e.g. an intersection between lines, a spot, etc., provided that it is easily identifiable by an operator or automatically by image processing.

Figure 2:
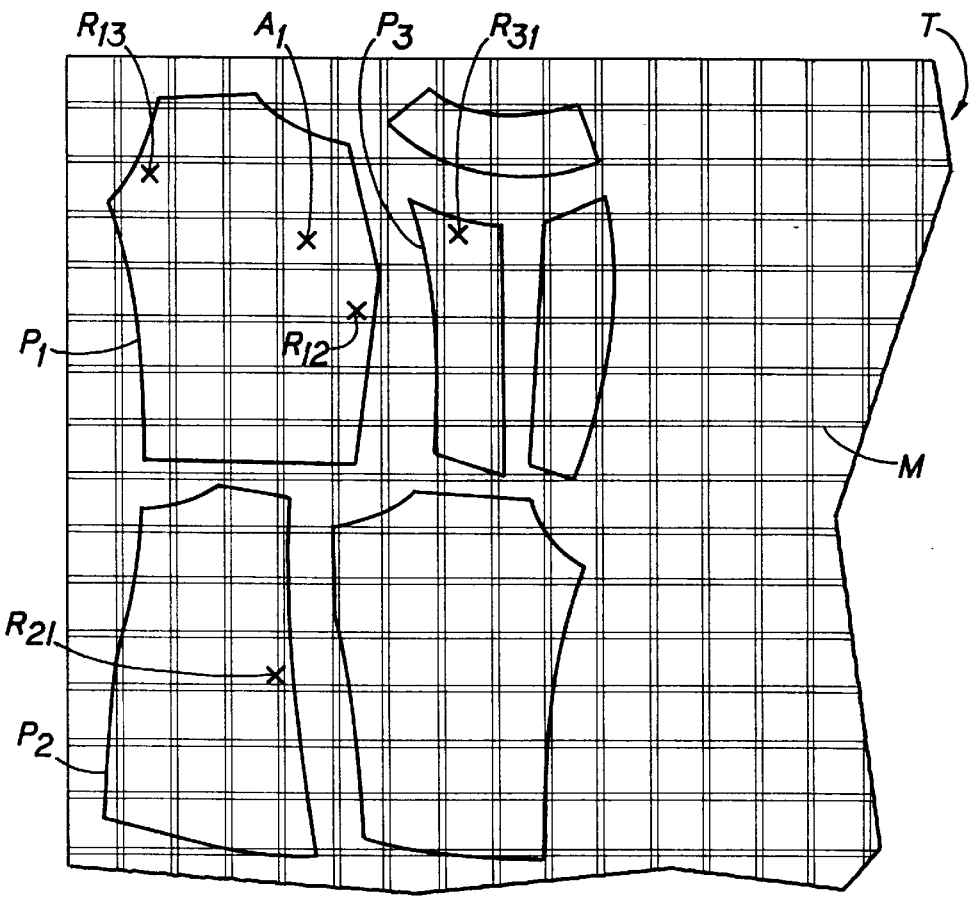
FIG. 2 is a very diagrammatic view of a layout on a patterned fabric.
Figure 3A:
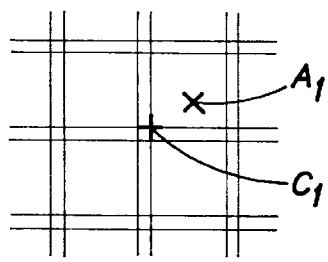
FIGS. 3A and 3B are larger-scale views of respective zones of the FIG. 2 layout, which zones respectively include an absolute position reference point and a relative position reference point.
Figure 3B:
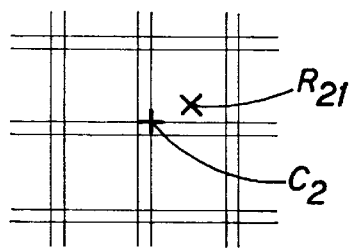

Thus, in the example shown in FIGS. 2, 3A, and 3B, the position information relating to point $A_1$ is constituted by the co-ordinates of the pattern characteristic point $C_1$ nearest to $A_1$, and the position information relating to point $R_{21}$ is constituted by the co-ordinates of the pattern characteristic point $C_2$ nearest to $R_{21}$. The same applies for the other position reference points.

By storing the information relating to the position reference points, it is possible, prior to cutting the fabric, to verify that the locations of the pieces as determined while the layout is being defined are correct relative to the pattern of the fabric as spread out on the cutting table. There can be differences between the "ideal" fabric used to define the layout, and the real fabric spread out. Such differences can result from shifts in the pattern repeat pitches of the patterns or from often inevitable deformation of the fabric while the layout is being defined or while the fabric is advancing on the cutting table.

Therefore, prior to cutting the first pieces, a monitoring step is performed so as to determine whether the pre-established layout is correct, and so as to correct it if necessary. In this example, such monitoring is performed by going, on the spread-out fabric, to the stored co-ordinates of the characteristic points associated with the position reference points, and by verifying whether the characteristic points of the pattern on the spread-out fabric are actually to be found at these locations. Whenever one of them is not, then a search is made for the nearest characteristic point on the spread-out fabric, and the shift between the stored ideal position and the nearest real position represents the offset to be corrected for the corresponding piece in the layout.

For each piece carrying a reference point for which the co-ordinates of a pattern characteristic point are stored, the spread-out fabric is monitored by taking an image of a portion of the surface of the fabric around a point having these co-ordinates.

For this purpose, the installation shown in FIG. 1 is provided with an image sensor 60, e.g. in the form of a camera, mounted on the slider 42. The camera can be displaced over the cutting table in directions X and Y in the same way as the cutting head, by means of the computer 18. However, it is possible to use means different from those used to displace the cutting head for displacing the camera in directions X and Y.

The images supplied by the camera 60 are stored in a memory of the computer 18, and they may be viewed on a screen 19 of a workstation associated with the computer.

Figure 4A:
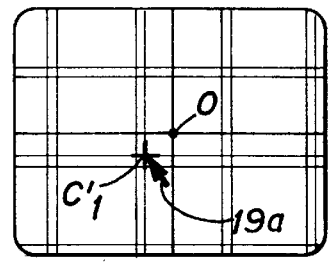
FIGS. 4A and 4B are views of images of zones of the surface of the fabric as spread out, which zones include points whose co-ordinates correspond to the position information relating to the reference points in FIGS. 3A and 3B.

FIG. 4A shows the image, as displayed on the screen 19, of a portion of the surface of the spread-out fabric, which portion is centered on a point whose co-ordinates are those, as pre-recorded, of the characteristic point $C_1$ associated with the position reference point $A_1$. The center O of the screen corresponds to the center of the image, and therefore to the stored co-ordinates of the point $C_1$. In the example shown, it can be observed that the center of the screen does not correspond to a pattern characteristic point, the nearest pattern characteristic point being $C'_1$. It is considered that the point $C'_1$ should have been located at the center of the screen, the vector $\overrightarrow{OC'_1}$ representing the offset between the position of the piece $P_1$ relative to the ideal pattern in the layout and its real position relative to the pattern on the fabric as spread out in compliance with the layout. The layout is corrected so as to eliminate the offset, i.e. by modifying the position of the piece $P_1$ in the layout by moving it in translation through a vector opposite to the vector $\overrightarrow{OC'_1}$.

The offset vector $\overrightarrow{OC'_1}$ is measured, for example, by determining the co-ordinates of the point $C'_1$. This may be done by the operator by indicating, by means of a cursor 19a, the position of the point $C'_1$ on the screen 19, the computer 18 then determining the vector $\overrightarrow{OC'_1}$ and correcting the position of the piece $P_1$ in the layout accordingly.

In a variant, the co-ordinates of the point $C'_1$ may be determined by automatically processing the image taken by the camera 60. The automatic processing consists in searching the image for the positions of the pattern characteristic points, and in selecting that one of the pattern characteristic points which is nearest to the ideal point corresponding to the pre-recorded co-ordinates. It is then not necessary to display the images on a screen. Various image-processing methods making it possible to perform such an automatic search may be used, e.g. by correlation with a pre-recorded image of a pattern characteristic point or by using a process of searching for offsets between similar images, such as, for example, the process described in Document EP 0 518 473.

Figure 4B:
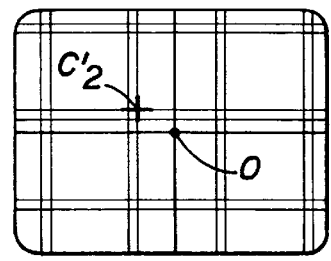

FIG. 4B shows the image, as displayed on the screen 19, of a portion of the surface of the spread-out fabric, which portion is centered on a point whose co-ordinates are those, as pre-recorded, of the characteristic point $C_2$ associated with the position reference point $R_{21}$. In the example shown, once again the point O does not coincide with a pattern characteristic point, the nearest characteristic point being the point $C'_2$. The position of the piece $P_2$ in the layout must therefore be corrected by subjecting it to a translation through vector $\overrightarrow{C'_2O}$.

The same method is used for all of the pieces in the layout that carry position reference points. The monitoring step is performed on the pieces concerned starting from the downstream end of the spread-out fabric, i.e. in the order in which they are then cut.

Once an offset has been detected for a piece, it can be advantageous to correct not only the location of this piece in the layout but also the locations of all of the other pieces that carry position reference points whose positions on the spread-out fabric have not been monitored. In this way it is possible to correct pre-emptively systematic shifts between the ideal pattern on the fabric used to define the layout, and the real pattern on the spread-out fabric.

When there are non-uniform shifts between the ideal pattern and the real pattern, e.g. a pattern pitch on the real fabric that is slightly larger or slightly smaller than the pitch of the pattern on the ideal fabric, such pre-emptive correction also makes it possible for an error equal to one pattern pitch step or to an integer number of pattern pitch steps to occur during monitoring, as a result of the accumulation of the shifts over the entire layout.

Provision may also be made to store the offsets successively detected for the various monitored pieces so as to correct pre-emptively the positions of the non-monitored pieces as a function of the variation of the detected offsets, e.g. by establishing a variation relationship on the basis of the offsets already detected.

It is not necessary for the entire layout to be on the cutting table to perform the monitoring step. Any corrections to the layout are made sequentially and, as soon as an image taken by means of the camera 60 has been processed, it is no longer necessary to keep it in the memory.

In practice, as soon as a segment of the lay-up 20 has advanced onto the cutting table, the images for the various pieces whose locations are on the cutting table and which carry position reference points can be taken sequentially and stored, thereby releasing the means for controlling the displacement of the slider 42 so that cutting can be performed. Cutting can commence with the first piece to be cut as soon as any corrections have been made to its position, it being possible for processing of the other images to be continued after cutting has commenced.

This is a major advantage offered by the method in terms of productivity and of cost. The time taken to monitor the spread-out fabric, during which time the installation is not available for cutting, is limited to as short as possible. In addition, it is not necessary for the entire layout to be on the cutting table to perform the monitoring prior to commencing cutting. This makes it possible to use a cutting table that is short and therefore more compact and cheaper. It also makes it possible to save time by advancing the lay-up at least in part during cutting, as in the method described in above-mentioned Document WO-A-95/02489, and therefore to increase productivity still further.

The same does not apply when, as described relative to the prior art, monitoring the positions of the match points makes it necessary to compare two images taken on the spread-out fabric. Not only is it then necessary to scan the layout completely in order to take all of the necessary images, but it is also necessary to provide large storage means for storing the images. Compared with that known method, the method of the invention is remarkable in that, for match points, referencing by means of pattern characteristic points makes it unnecessary to compare images. Furthermore, referencing by means of pattern characteristic points simplifies the monitoring step whether said step is performed by an operator or automatically, and such referencing can then advantageously also be used for absolute position reference points.

Figure 5:
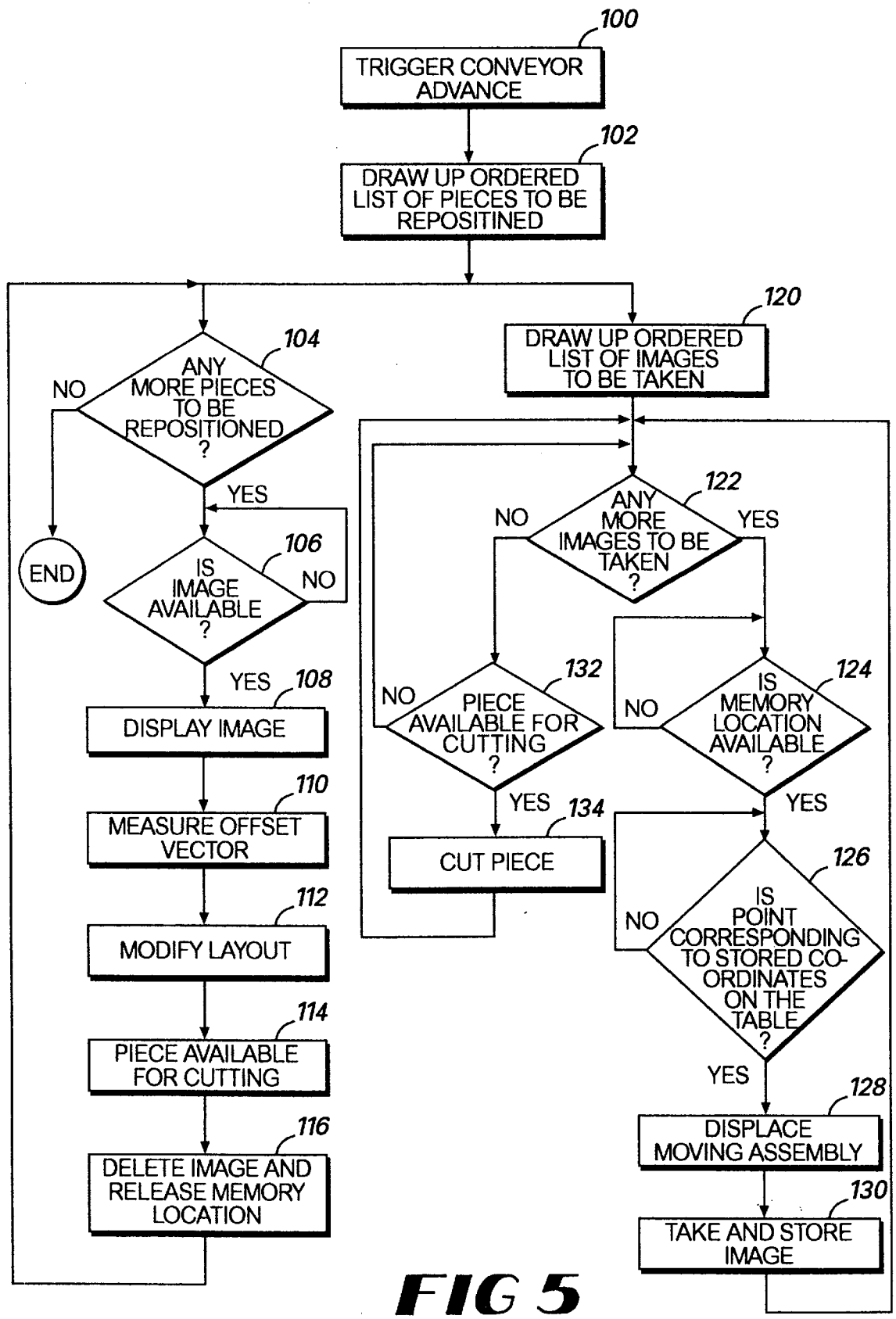
FIG. 5 is a flow chart showing the procedure followed in an implementation of the method of the invention.

A flow chart describing the correction operations, in which any corrections are made to the layout, and the cutting operations is shown in FIG. 5.

On triggering an initial advance of the conveyor 12 (stage 100), an ordered list is drawn up (stage 102) of any pieces that might need to be repositioned. These pieces are pieces whose locations are situated on the portion of fabric fed in on the conveyor, and which carry position reference points, in the order in which they are to be cut.

Next, the graphics tasks at the workstation and the control tasks for controlling the moving assembly carrying the camera and the cutting head proceed in parallel.

At the workstation, if there remains in the pre-established list a piece that might need repositioning (test 104), an examination is performed to see whether the corresponding image is available (test 106). If test 106 is negative, the image is awaited. If it is positive, the image is displayed (step 108), the offset vector is measured, automatically or by manually displacing the cursor 19a (step 110), the position of the piece in question in the layout is modified if necessary (step 112), as are the positions in the layout of the non-processed pieces where necessary, and the piece in question is declared available for cutting (step 114), whereupon the image is deleted from the memory, thereby releasing a memory location (step 116), before returning to test 104. If test 104 is negative, the tasks are terminated until the conveyor is triggered again.

At the moving assembly control means, an ordered list of the images to be taken is drawn up (step 120). So long as there remains an image to be taken (test 122), and if a memory location is available (test 124), an examination is made to see whether the point corresponding to the co-ordinates of the pattern characteristic point for the piece in question is on the table (test 126). If test 126 is positive, the camera is displaced (stage 128), and the desired image is taken and stored (stage 130) before returning to test 122. If test 124 is negative, an available memory location is awaited, and if test 126 is negative, there is a wait until the point at which the camera is to be positioned is on the working surface. Once there are no more images to be taken (test 122), an examination is made to see whether a piece is available for cutting (test 132). A negative response to test 132 means a return to test 122. If the response is positive, the piece is cut (stage 134) before returning to test 122.

The flow chart in FIG. 5 shows clearly that the moving assembly can be displaced for taking images as soon as the fabric starts advancing, and it is possible to start cutting a piece as soon as the position of the piece has been corrected, even before the end of processing of the following piece. Furthermore, the system can make do with a limited number of memory locations for storing the images.

In the embodiment described above, the reference point chosen for a piece is the pattern characteristic point that is nearest to the absolute position reference point or to the match point. This makes it possible to measure the real pitch of the pattern on the spread-out fabric as close as possible to the locations of the position reference points, and, as a result, to guarantee that said position reference points are in positions that are as exact as possible relative to the pattern of the spread-out fabric.

However, this does not necessarily always have to be the case, and a pattern characteristic point that is not necessarily the nearest to a position reference point may be chosen as a reference point, e.g. for a piece carrying a plurality of position reference points or for a small-sized piece.

Furthermore, the real pitch on the spread-out fabric may be detected by means other than selecting a pattern characteristic point.

For example, for a fabric having a check or striped pattern, the real pitch of the pattern may be detected by counting rows from one end of the fabric in the longitudinal direction, and from one edge of the fabric in the transverse direction. The layout can thus be matched almost continuously to the reality of the spread-out fabric by measuring each new real pitch of the pattern.

I claim:

1. A method for cutting pieces from a fabric having a repetitive pattern with a pitch, the distance between successive patterns, the method comprising the steps of:

a. determining an ideal layout for the pieces on the fabric having an ideal pitch for its repetitive pattern;

b. selecting a characteristic point of the repetitive pattern of the fabric with the ideal pitch, the position of which point is repeated in the same way as the pattern;

c. defining the position of at least one reference point coinciding with a characteristic point of the pattern of the fabric with the ideal pitch;

d. storing the location of the reference point for the ideal layout of the pieces on the fabric with the ideal pitch;

e. spreading at least one layer of fabric having a repetitive pattern with a real pitch to be cut;

f. monitoring the spread fabric by taking an image of a portion of the spread fabric including a point whose location on the spread fabric corresponds to the stored location of the reference point;

g. detecting from the image any offset between the point whose location on the spread fabric corresponds to the stored location of the reference point and the nearest characteristic point of the pattern on the spread fabric;

h. modifying, when necessary, the ideal layout as a function of the detected offset to produce a modified layout which matches the ideal layout to the real pitch of the spread fabric;

g. cutting pieces of the modified layout.

2. The method according to claim 1, wherein the modifying step, for each of the pieces that have not yet been processed and with which reference points are associated, further includes modifying the information representative of the positions of the reference points preemptively in the same way as the position of the piece is modified.

3. The method according to claim 1, wherein for each piece in question:

a. the monitoring step further comprises taking an image of a portion of the surface of the spread fabric, which portion includes the point on the fabric whose co-ordinates on the spread fabric correspond to the stored position information for the reference point of the piece; and b. the detecting step further comprises detecting the offset between the real position of the reference point on the fabric and the real position of the nearest characteristic point of the pattern in the image.

4. The method according to claim 3, wherein a. the monitoring step further comprises displaying the image as taken on a screen and causing to appear on the screen the position of the reference point whose co-ordinates correspond to the stored position information; and b. the detecting step further includes inputting, on the basis of the image displayed on the screen, the real position of the characteristic point of the pattern that is nearest to the position of the reference point as it appears.

5. The method according to claim 4, wherein the real position of the characteristic point of the pattern that is nearest to the position of the reference point as it appears is input by indicating said real position by means of a cursor.

6. The method according to claim 3, wherein the offset-detection step is performed by automatically processing the image as taken.

7. The method according to claim 1, wherein for each of a plurality of pieces, defining at least one match point whose position is chosen so that, after cutting, it is possible to assembled pieces together in a desired manner taking into account the pattern of the fabric, by bringing the match points of the various pieces into register with one another; and wherein the reference point chosen for each of the pieces is the characteristic point of the pattern that is nearest to the match point.

8. The method according to claim 1, wherein for at least one main piece of the layout, an absolute position reference point whose position is chosen as a function of the desired positioning of the piece relative to the pattern of the fabric; and wherein the reference point chosen for the main piece is the characteristic point of the pattern that is nearest to the absolute position reference point.

9. The method according to claim 1, wherein the fabric is cut starting from a longitudinal end as the monitoring and detecting steps proceed.

10. The method according to claim 9, wherein the method further comprises the steps of:

a. using a cutting table whose length is less than the total length of the ideal layout;

b. advancing at least one layer of fabric having a repetitive pattern with a real pitch to be cut onto the cutting table so that the fabric is disposed in a working zone of the cutting table;

c. performing the monitoring and detecting steps on the portion of fabric spread in the working zone;

d. cutting pieces of the modified layout situated in the working zone of the cutting table.

11. The method according to claim 10, wherein the monitoring and detecting steps are performed at least in part while the fabric is advancing.

* * * * *

UNITED STATES PATENT AND TRADEMARK OFFICE
CERTIFICATE OF CORRECTION

PATENT NO. : 5,975,743
DATED : November 2, 1999
INVENTOR(S) : Jean-Louis Bercaits It is certified that error appears in the above-identified patent and that said Letters Patent is hereby corrected as shown below:

Column 14, line 2, claim 9, delete "a" and insert --said--

Signed and Sealed this

Thirtieth Day of January, 2001

Attest:

Q. TODD DICKINSON

Attesting Officer      Director of Patents and Trademarks